US006737117B2

(12) United States Patent
Boisvert et al.

(10) Patent No.: US 6,737,117 B2
(45) Date of Patent: May 18, 2004

(54) HYDROSILSESQUIOXANE RESIN COMPOSITIONS HAVING IMPROVED THIN FILM PROPERTIES

(75) Inventors: Ronald P. Boisvert, Midland, MI (US); Duane R. Bujalski, Auburn, MI (US); Brian R. Harkness, Midland, MI (US); Zhongtao Li, Midland, MI (US); Kai Su, Midland, MI (US); Bianxiao Zhong, Midland, MI (US)

(73) Assignee: Dow Corning Corporation, Auburn, MI (US)

( * ) Notice: Subject to any disclaimer, the term of this patent is extended or adjusted under 35 U.S.C. 154(b) by 60 days.

(21) Appl. No.: 10/116,953

(22) Filed: Apr. 5, 2002

(65) Prior Publication Data

US 2003/0191267 A1 Oct. 9, 2003

(51) Int. Cl.$^7$ .................................................. B05D 3/04
(52) U.S. Cl. ....................... 427/377; 427/387; 427/515; 525/477
(58) Field of Search ................................ 427/377, 387; 427/515; 525/477; 528/31

(56) References Cited

U.S. PATENT DOCUMENTS

| 5,290,354 | A | 3/1994 | Haluska | 106/479 |
|---|---|---|---|---|
| 5,665,809 | A | 9/1997 | Wójtowicz | 524/439 |
| 5,665,849 | A | 9/1997 | Cho | 528/31 |
| 6,022,814 | A | 2/2000 | Mikoshiba et al. | 438/789 |
| 6,143,360 | A | 11/2000 | Zhong | 427/244 |
| 6,143,855 | A | 11/2000 | Hacker et al. | 528/31 |
| 6,177,199 | B1 | 1/2001 | Hacker et al. | 428/447 |
| 6,184,260 | B1 | 2/2001 | Zhong | 521/77 |
| 6,197,913 | B1 | 3/2001 | Zhong | 528/31 |
| 6,232,424 | B1 | 5/2001 | Zhong et al. | 528/12 |
| 6,472,076 | B1 | * 10/2002 | Hacker | 428/447 |
| 6,596,404 | B1 | * 7/2003 | Albaugh et al. | 428/447 |

FOREIGN PATENT DOCUMENTS

| EP | 0 323 186 | 3/1994 |
|---|---|---|
| EP | 0 276 263 | 4/1996 |

OTHER PUBLICATIONS

Crivello, "Cationic Polymerization—Iodonium and Sulfonium Salt Photoinitiators," *Advances in Polymer Science* 62:1–47 (1984).

* cited by examiner

Primary Examiner—Margaret G. Moore
Assistant Examiner—Marc S Zimmer
(74) Attorney, Agent, or Firm—Williams, Morgan & Amerson, P.C.

(57) ABSTRACT

Herein is disclosed a resin solution, comprising (a) about 0.1 solids wt % to about 50 solids wt % of an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; and (b) about 50 solids wt % to about 99.9 solids wt % of a resin comprising at least about 90 mole % of the formula $HSiO_{3/2}$. Also disclosed herein is a method of preparing such a resin solution, as well as a method of preparing a solid coating, comprising (i) coating the resin solution on a surface; (ii) removing the solvent from the resin solution; (iii) removing R groups from the organosiloxane resin; and (iv) curing the resin solution, to form the solid coating. Coatings prepared from the resins disclosed herein have relatively low dielectric constants and also have relatively low SiH content and relatively high modulus.

11 Claims, No Drawings

HYDROSILSESQUIOXANE RESIN COMPOSITIONS HAVING IMPROVED THIN FILM PROPERTIES

FIELD OF THE INVENTION

The present invention relates to dielectric coatings in semiconductor devices. More particularly, it relates to dielectric coatings formed from siloxane-based resins and having relatively low dielectric constant, relatively low SiH content, and relatively high modulus.

BACKGROUND OF THE INVENTION

Semiconductor devices often have one or more arrays of patterned interconnect levels that serve to electrically couple the individual circuit elements forming an integrated circuit (IC). The interconnect levels are typically separated by an insulating or dielectric coating. Previously, a silicon oxide coating formed using chemical vapor deposition (CVD) or plasma enhanced techniques (PECVD) was the most commonly used material for such dielectric coatings.

Dielectric coatings formed from siloxane-based resins have found use because such coatings provide lower dielectric constants than CVD or PECVD silicon oxide coatings and also provide other benefits such as enhanced gap filling, surface planarization and have a high resistance to cracking. It is desirable for such siloxane-based resins to provide coatings by standard processing techniques such as spin coating.

In general, there are two types of dielectric coatings which serve as inter-layer dielectrics (ILD). The first type is a pre-metal dielectric material (PMD) formed before a metalization process is performed. The PMD serves as an insulating layer between the semiconductor component and the first metal layer. The second type of dielectric is an inter-metal dielectric (IMD), which is a dielectric layer interposed between two metallic layers for insulation.

Semiconductor processes for manufacturing integrated circuits often require forming a protective layer, or layers, to reduce contamination by mobile ions, prevent unwanted dopant diffusion between different layers, and isolate elements of an integrated circuit. Typically, such a protective layer is formed with silicon-based dielectrics, such as silicon dioxide, which may take the form of undoped silicate glass, borosilicate glass (BSG) or borophosphorous silicate glass (BPSG). If these dielectrics are disposed beneath the first metal layer of the integrated circuit, they are often referred to as pre-metal dielectrics.

Hydrosilsesquioxanes, such as FOx resins available from Dow Corning, Midland Mich., are widely used in the semiconductor industry as interlevel dielectric materials. However, in the continuing pursuit of high speed and high performance chips, hydrosilsesquioxanes that form silica layers with a higher modulus and higher crack resistance are desirable. Also desirable are the formation of silica layers having reduced SiH content and improved planarization and gap fill. These properties would enhance ease of integration.

Zhong, U.S. Pat. No. 6,143,360, teaches a method for preparing a nanoporous silicone resin involving contacting a hydridosilicon containing resin with a $C_8$–$C_{28}$ 1-alkene in the presence of a platinum group metal-containing hydrosilation catalyst, with subsequent thermolysis of the alkene groups from the reaction product.

Zhong, U.S. Pat. No. 6,197,913, teaches a method for preparing a nanoporous silicone resin involving contacting a hydridosilicon containing resin with an alkenyltriarylsilane in the presence of a platinum group metal-containing hydrosilation catalyst, with subsequent thermolysis of the triarylsilylalkylene groups from the reaction product.

Zhong, U.S. Pat. No. 6,232,424, teaches silicone resin compositions and methods for their preparation, wherein the resin comprises the reaction product of a tetraalkoxysilane, wherein the alkoxy groups have from 1 to about 6 carbon atoms, an organosilane comprising one $C_1$–$C_6$ alkyl group or phenyl group and three hydrolyzable substituents, and an organotrialkoxysilane comprising one $C_8$–$C_{24}$ hydrocarbon group and three $C_1$–$C_6$ alkyl groups.

Mikoshiba et al., U.S. Pat. No. 6,022,814, discloses a polymer having a repeating unit of the structure $R^1SiO_{3/2}$, $R^1(R^2)SiO_{2/2}$, or $R^1{}_2SiO_{2/2}$, wherein $R^1$ is a substituent group that can be eliminated at a temperature ranging from 250° C. to the glass transition temperature of the polymer. Examples of $R^1$ include 3,3,3-trifluoropropyl, β-phenethyl, t-butyl, 2-cyanoethyl, benzyl, and vinyl. Mikoshiba teaches that the polymer can be blended with a hydrosilsesquioxane resin. The dielectric constant, SiH content, and modulus of a silica film formed from the resin were not reported.

Wojtowicz, U.S. Pat. No. 5,665,809, teaches a method of fabricating an extruded silicone gel profile, wherein the silicone gel comprises a first silicone component comprising methyl, ethyl, higher alkyl, 3,3,3-trifluoropropyl, or phenyl substituents and a second silicone component comprising methyl, ethyl, higher alkyl, 3,3,3-trifluoropropyl, or phenyl substituents. Wojtowicz did not teach the formation of a silica film.

Cho, U.S. Pat. No. 5,665,849, teaches a modified hydrogen silsesquioxane (HSQ) precursor comprising HSQ and a modifying agent, such as alkyl alkoxysilane.

Hacker et al., U.S. Pat. Nos. 6,143,855 and 6,177,199, teach organohydridosiloxane polymers having organic substituents, and a process of making dielectric films therefrom.

A need remains for silica coatings which have relatively low dielectric constants as well as relatively low SiH content and relatively high modulus.

SUMMARY OF THE INVENTION

In one embodiment, the present invention relates to a resin blend, comprising:
(a) about 0.1 solids wt % to about 50 solids wt % of an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; and
(b) about 50 solids wt % to about 99.9 solids wt % of a resin comprising at least about 90 mole % of the formula $HSiO_{3/2}$.

In another embodiment, the present invention relates to an organosiloxane resin comprising the formula $(RSiO_{3/2})_x(HSiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_{4-C \geq}$ substituted hydrocarbon; x is from about 5 mole % to about 75 mole %; y is from about 10 mole % to about 95 mole %; and x+y is at least about 40 mole %.

In a further embodiment, the present invention relates to a method of preparing a solid coating, comprising:

(i) applying a resin solution comprising (a) about 0.1 solids wt % to about 50 solids wt % of an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; (b) about 50 solids wt % to about 99.9 solids wt % of a resin comprising at least about 90 mole % of the formula $HSiO_{3/2}$; and (c) a solvent, wherein the resin solution comprises from about 0.5 w/v % total solids to about 50 w/v % total solids, to a surface;

(ii) removing the solvent from the resin solution;

(iii) removing R groups from the organosiloxane resin; and (iv) curing the resin solution, to form the solid coating.

The resin solution and methods of the present invention enhance the formation of silica coatings which have relatively low dielectric constants as well as relatively low SiH content and relatively high modulus.

DETAILED DESCRIPTION OF THE INVENTION

In one embodiment, the present invention relates to a resin blend, comprising:

(a) about 0.1 solids wt % to about 50 solids wt % of an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_{4–C24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; and (b) about 50 solids wt % to about 99.9 solids wt % of a resin comprising at least about 90 mole % of the formula $HSiO_{3/2}$.

The organosiloxane resin comprising the formula $(RSiO_{3/2})_x(R'SiO_{3/2})_y$ can be any such compound in which R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon. The terms "alkyl," "alkenyl," "alkoxy," and "alkenoxy" are meant to include linear, branched, and cyclic structures. By "substituted hydrocarbon" is meant a structure comprising carbon, hydrogen, and at least one other atom that does not substantially react with the $HSiO_{3/2}$ resin. Preferably, the other atom is selected from the group consisting of oxygen, nitrogen, silicon, or sulfur.

In one embodiment, R is a $C_4$–$C_{24}$ alkyl. In another embodiment, R is a $C_6$–$C_{24}$ alkyl. In a further embodiment, R is a $C_{16}$–$C_{22}$ alkyl. In another embodiment, R is a $C_4$–$C_{24}$ alkenyl. In another embodiment, R is a $C_8$–$C_{24}$ alkenyl. In another further embodiment, R is a $C_{16}$–$C_{22}$ alkenyl. In yet another embodiment, R is a $C_4$–$C_{24}$ alkoxy. In yet a further embodiment, R is a $C_{16}$–$C_{22}$ alkoxy. In still another embodiment, R is a $C_8$–$C_{24}$ alkenoxy. In still a further embodiment, R is a $C_{16}$–$C_{22}$ alkenoxy.

In one preferred embodiment, R is selected from the group consisting of $C_{18}$–$C_{20}$ alkyl and $C_{18}$–$C_{20}$ alkenoxy. In a more preferred embodiment, R is selected from the group consisting of 3,7,11,15-tetramethyl-3-hydroxyhexadecyl and octadecyl.

In another preferred embodiment, R is a branched $C_4$–$C_{24}$ alkoxy. In one more preferred embodiment, R is tert-butoxy.

R' is selected from the group consisting of —H, $C_1$–$C_4$ unsubstituted hydrocarbon, and $C_1$–$C_4$ substituted hydrocarbon. "Unsubstituted hydrocarbon," as used herein, refers to any structure consisting of carbon and hydrogen, e.g., methyl, ethyl, propyl, butyl, or tert-butyl groups.

The term "mole %," as used herein, refers to the percentage of silicon atoms having the bonds indicated by the formula. In other words, for example, when x is 6 mole %, 6% of silicon atoms are present in $RSiO_{3/2}$ structures.

In one preferred embodiment, in the structure of the organosiloxane resin given above, x is from about 15 mole % to about 25 mole %, and y is from about 75 mole % to about 85 mole %. This embodiment is especially preferred when R is selected from the group consisting of 3,7,11,15-tetramethyl-3-hydroxyhexadecyl and octadecyl.

In another preferred embodiment, x is about 70 mole %, and y is about 30 mole %. This embodiment is especially preferred when R is tert-butoxy.

Given that x+y is at least about 40 mole %, up to about 60 mole % of silicon atoms in the organosiloxane resin may be present in structures other than $RSiO_{3/2}$ and $R'SiO_{3/2}$. Examples of such structures include, but are not limited to, $SiO_{4/2}$, $RHSiO_{2/2}$, $HOSiO_{3/2}$, $H(HO)SiO_{2/2}$, $RH_2SiO_{1/2}$, $R(H)(HO)SiO_{1/2}$ and $R(HO)SiO_{2/2}$, among others. In one preferred embodiment, substantially all the silicon atoms in the organosiloxane resin present in structures other than $RSiO_{3/2}$ and $R'SiO_{3/2}$ are present in $SiO_{4/2}$. In another preferred embodiment, no more than about 99% of the silicon atoms in the organosiloxane resin are present in $RSiO_{3/2}$, $R'SiO_{3/2}$, and $SiO_{4/2}$.

The resin comprising at least about 90 mole % $HSiO_{3/2}$ units may be referred to herein as a hydrosilsesquioxane resin. Up to about 10 mole % of silicon atoms in the hydrosilsesquioxane resin may be present in structures other than $HSiO_{3/2}$, including $HOSiO_{3/2}$ and $H(HO)SiO_{2/2}$, among others known to one of ordinary skill in the art.

By "solids wt %," as that term is used herein, is meant the percentage by weight of solid components of the blend, i.e., excluding solvent, if any solvent is present.

In addition to the organosiloxane resin and the hydrosilsesquioxane resin, the resin blend may comprise further components, such as a photobase generator. In one preferred embodiment, the resin blend further comprises about 0.1 wt % to about 10 wt % photoacid generator relative to resin. As used herein, "photoacid" refers to a compound that decomposes on exposure to light to generate an acid catalyst. Exemplary photoacids include onium salts, such as diaryliodonium, triarylsulfonium, dialkylphenacylsulfonium, and dialkyl-4-hydroxyphenylsulfonium salts, among others. A description of these exemplary photoacids is given by Crivello, *Adv. Polym. Sci.* 62:1–48, Springer-Verlag (Berlin) 1984.

The resin blend may further comprise a solvent. Any solvent in which the organosiloxane resin and the hydrosilsesquioxane resin are soluble can be used in the resin solution. Any solids content at which the resins are soluble and which is compatible with the intended use of the resin can be used. Typically, the resin solution comprises from about 5 w/v % total solids to about 50 w/v % total solids. Preferably, the solvent is selected from the group consisting of isobutyl isobutyrate, mesitylene, cyclohexanone, xylene, methyl isobutyl ketone (MIBK), and mixtures thereof. In one preferred embodiment, the solvent is isobutyl isobutyrate. In another preferred embodiment, the solvent is mesitylene. In yet another preferred embodiment, the solvent is xylene. In still another preferred embodiment, the solvent is MIBK.

Preferably, the solids content of the resin solution is from about 15 w/v % to about 25 w/v %.

The resin blend or resin solution and components thereof can be prepared by any appropriate technique known in the art. Exemplary techniques for preparing siloxane resins include those taught by pending Dow Corning patent applications Ser. Nos. 09/723,051; 09/915,899; 09/915,902; 09/915,903; and 09/951,899.

In another embodiment, the present invention relates to an organosiloxane resin comprising the formula $(RSiO_{3/2})_x$ $(HSiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_{4-C24}$ substituted hydrocarbon; x is from about 5 mole % to about 75 mole %; y is from about 10 mole % to about 95 mole %; and x+y is at least about 40 mole %. The definitions of R, x, y, and x+y are as given above. In one preferred embodiment, R is $C_{18}$ alkyl, x is from about 5 mole % to about 15 mole %, and y is from about 25 mole % to about 95 mole %. In one preferred embodiment, x+y is from at least about 40 mole % to about 99 mole %, with the balance selected from groups other than $SiO_{4/2}$, for example, $RHSiO_{2/2}$, $HOSiO_{3/2}$, $H(HO)SiO_{2/2}$, $RH_2SiO_{1/2}$, $R(H)(HO)SiO_{1/2}$, and $R(HO)SiO_{2/2}$, among others.

The organosiloxane resin of this embodiment can be a solute in a solvent. Any solvent in which the organosiloxane resin is soluble can be used. Any solids content at which the resin is soluble and which is compatible with the intended use of the resin can be used. Typically, the solution of this embodiment comprises from about 5 w/v % total solids to about 50 w/v % total solids. Preferably, the solvent is selected from the group consisting of isobutyl isobutyrate, mesitylene, cyclohexanone, xylene, methyl isobutyl ketone (MIBK), and mixtures thereof. In one preferred embodiment, the solvent is isobutyl isobutyrate. In another preferred embodiment, the solvent is mesitylene. In yet another preferred embodiment, the solvent is xylene. In still another preferred embodiment, the solvent is MIBK. Preferably, the solids content of the solution of this embodiment is from about 15 w/v % to about 25 w/v %.

In another embodiment, the present invention relates to a method of preparing a solid coating, comprising:

(i) applying a resin solution comprising (a) an organosiloxane resin comprising the formula $(RSiO_{3/2})_x$ $(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; and (b) a solvent, wherein the resin solution comprises from about 5 w/v % total solids to about 50 w/v % total solids, to a surface;

(ii) removing the solvent from the resin solution;

(iii) removing the R groups from the organosiloxane resin; and (iv) curing the resin solution, to form the solid coating.

The resin solution, including the organosiloxane resin and the solvent, is as described above. In certain embodiments, the resin solution further comprises a photoacid, preferably at a concentration of about 2 w/v %.

In certain embodiments, the resin solution further comprises (c) about 50 solids wt % to about 99.9 solids wt % of a resin comprising at least about 90 mole % of the formula $HSiO_{3/2}$. In these embodiments, the organosiloxane resin comprises from about 0.1 solids wt % to about 50 solids wt % of the resin solution.

In the applying step, the resin solution is applied to a surface. The resin solution can be applied to any surface which is desired to receive a solid coating. Electronic substrates are of particular interest as surfaces to which the resin solution can be applied according to this method. Specific methods for application of the resin solution to a substrate include, but are not limited to, spin coating, dip coating, spray coating, flow coating, and screen printing, among others. The preferred method for application is spin coating.

After application of the resin solution to the surface, the solvent is removed from the resin solution. Typically, removal involves allowing the solvent to evaporate from the coated substrate resulting in the deposition of the resin coating on the substrate. By "removal" in this context is meant that at least about 90 vol % of the solvent is driven off. Preferably, at least about 95 vol % of the solvent is driven off. Any suitable technique for removal may be used, such as simple air drying by exposure to an ambient environment, the application of a vacuum, the application of heat, or a combination of two or more of the foregoing techniques. When spin coating is used to apply the resin solution to the surface, the additional drying method is minimized since the spinning drives off the solvent.

After the solvent has been removed, the R groups from the organosiloxane resin are removed. One of ordinary skill in the art will understand that removing the R groups can be performed at the same time as curing the resin, as will be described in more detail below. In this context, "removed" means that at least about 90 mol % of the R groups present in the organosiloxane resin are driven off, and preferably, at least about 99 mol % of the R groups present in the organosiloxane resin are driven off. Typically, removal of the R groups requires the application of energy and an oxidative atmosphere to the organosiloxane resin. Typically, the energy is provided in the form of heat or electromagnetic radiation, and the oxidative atmosphere is selected from the group consisting of air and from about 0.01 vol % to about 100 vol % $O_2$/balance substantially an inert gas or a mixture of inert gases. Preferably, the inert gas is nitrogen. Preferably, the oxidative atmosphere is selected from the group consisting of (i) air and (ii) mixtures of about 10 vol % $O_2$ in an inert gas or a mixture of inert gases. Preferably, $O_2$ is present in the mixtures at from about 8 vol % to about 12 vol %. Preferably, the inert gas is nitrogen.

In one embodiment, removing R groups comprises baking the resin at about 350° C. for from about 1 sec to about 10 min under an oxidative atmosphere. "Baking" refers to the application of heat, which can be applied by radiation, convection, or conduction. Preferably, baking is performed for at least about 1 min, and more preferably, baking is performed for at least about 90 sec.

In another embodiment, removing R groups comprises exposing the resin to ultraviolet light, wherein the resin solution comprises a photoacid. In one preferred embodiment, the ultraviolet light has an intensity of at least about 2000 mJ/cm². The area referred to is the surface area of the surface of the substrate coated with the organosiloxane resin. "Ultraviolet light" is defined as electromagnetic radiation having a peak wavelength from about 150 nm to about 450 nm.

In a further embodiment, removing R groups involves exposing the resin solution to an oxidative atmosphere during curing of the resin. The oxidative atmosphere is as described above, and curing will be described in more detail below.

Once the R groups have been removed, though not to be bound by theory, it is believed that many Si—R moieties are replaced with Si—OH (silanol) moieties. It is also believed that voids are formed in the resin structure where R groups were driven off.

Either after the R groups have been removed from the organosiloxane resin, or during removal of the R groups from the organosiloxane resin, the resin solution is cured to form the solid coating. Typically, curing involves heating the resin 350° C. to about 1000° C. for a period of time sufficient to convert the organosiloxane resin into a silica coating. Preferably, the temperature is from about 400° C. to about 1000° C. In one preferred embodiment, curing involves heating the resin solution at about 400° C. for from about 30 min to about 1 hr under either an inert atmosphere, reduced pressure, or both. Time periods in the range of a few seconds to several minutes for thin films (less than about 0.2 $\mu$m) to several hours for thick films (greater than about 1 $\mu$m), depending on the temperature, are generally useful herein. Any inert atmosphere can be used, such as nitrogen, noble gases, or mixtures thereof. "Inert atmosphere," as used herein, refers to an atmosphere comprising less than about 0.01 vol % oxygen. Preferably, the inert atmosphere consists essentially of nitrogen. "Reduced pressure," as used herein, refers to an atmosphere with a pressure less than 760 mm Hg.

In another embodiment, wherein removal of R groups and curing of the resin are performed simultaneously, curing is performed in the presence of an oxidative atmosphere at the temperatures and for the durations described above. If the R groups were not removed from the resin prior to curing, preferably curing is conducted under an oxidative atmosphere.

The curing step results in a coating substantially free of traces of solvent and wherein substantially all silanol residues have undergone condensation to form a coating comprising from about 10 mole % to about 80 mole % $SiO_{4/2}$ units. Any method of heating, such as the use of a quartz tube furnace, a convection oven, or radiant or microwave energy is generally functionally herein. Similarly, the rate of heating is generally not a critical factor, but it is most practical and preferred to heat the coated substrate as rapidly as possible.

In another embodiment, the present invention relates to a solid coating formed by the method described above.

It has been discovered that a solid coating produced according to the method described above can exhibit a combination of useful properties. Specifically, by following the method, a solid coating can be produced having a dielectric constant of less than about 3.6, a SiH content less than about 75 percent, and a modulus greater than about 6.5 GPa, where the modulus is measured using nanoindentation. This technique involves the acquisition of load vs. displacement curves generated using a Berkovich tip from which modulus values are determined from the initial portion of the unloading curve. Modulus measurements are typically performed with 10000 Å-thick films and a tip penetration depth of 10% of the total film thickness.

The silica coatings produced herein may be produced on any substrate. However, the coatings are particularly useful on electronic substrates. The term "electronic substrate," as used herein, includes silicon-based devices and gallium arsenide-based devices intended for use in the manufacture of a semiconductor component including focal plane arrays, opto-electronic devices, photovoltaic cells, optical devices, transistor-like devices, 3-D devices, silicon-on-insulator devices, super lattice devices, flat panel displays, and the like.

The organosiloxane resin can be applied to an electronic substrate to form a premetal dielectric (PMD) or an intermetal dielectric (IMD) layer. The organosiloxane resin is especially useful in forming an IMD layer, following techniques known to one of ordinary skill in the art.

By the above method a silica coating is produced on the substrate. Preferably the silica coatings have a thickness of from about 0.02 $\mu$m to about 2 $\mu$m. A thickness of from about 0.1 $\mu$m to about 0.8 $\mu$m is more preferred. The coating smoothes the irregular surfaces of the various substrates and has excellent adhesion properties.

Additional coatings may be applied over the silica coating if desired. These can include, for example $SiO_2$ coatings, silicon-containing coatings, silicon carbon-containing coatings, silicon nitrogen-containing coatings, silicon oxygen nitrogen-containing coatings, silicon nitrogen carbon-containing coatings, and diamond-like coatings produced from deposition (i.e. CVD, PECVD, etc.) of amorphous SiC:H, diamond, or silicon nitride. Methods for the application of such coatings are known in the art. Any method of applying an additional coating known in the art can be used, and such methods include, but are not limited to, chemical vapor deposition techniques such as thermal chemical vapor deposition (TCVD), photochemical vapor deposition, plasma enhanced chemical vapor deposition (PECVD), electron cyclotron resonance (ECR), and jet vapor deposition. The additional coatings can also be applied by physical vapor deposition techniques such as sputtering or electron beam evaporation. These processes involve either the addition of energy in the form of heat or plasma to a vaporized species to cause the desired reaction, or they focus energy on a solid sample of the material to cause its deposition.

The insoluble silica coatings formed by this method are particularly useful as coatings on electronic devices such as integrated circuits.

EXAMPLES

The following non-limiting examples are provided so that one skilled in the art may more readily understand the invention.

Example 1

Samples $T^{H}T^{Iso}$ and $T^{H}T^{C18}$ were prepared by combining components (A), (B), and (C) as described below in the amounts described in Table 1:

(A) triethoxysilane, (B) an organotriethoxysilane, $RSi(OR'')_3$, and (C) mixture of methyl isobutyl ketone (MIBK) and xylene (8:2 weight ratio), enough to make the concentration of the resulting resin 9%.

To this mixture was added a mixture of (D) water and (E) hydrogen chloride in the amounts described in Table 1. The resulting reaction product was stripped of volatiles under reduced pressure at 60° C. until the solid content became 22–20%. Xylene was added to make the solid content 20%. The solution was then heated to reflux for 1 hour and water produced was removed continuously with a Dean Stark trap. The final solvent, mesitylene, was added, and the final concentration was achieved by stripping off excess solvent.

TABLE 1

Preparation of organosiloxane resins. Weight parts are per weight part of (A).

| Sample | RSi(OR")$_3$ | Wt parts (B) | Wt parts (C) | Wt parts (D) | Wt parts (E) | Mole % (A) | Mole % (B) | Final solvent | Resin wt % |
|---|---|---|---|---|---|---|---|---|---|
| $T^H T^{Iso}$ | (3,7,11,15-tetramethyl-3-hydroxy-hexadecyl)triethoxysilane | 0.89 | 8.65 | 0.044 | 0.48 | 76 | 24 | Mesitylene | 17 |
| $T^H T^{C18}$ | Octadecyltrimethoxysilane | 0.72 | 7.88 | 0.044 | 0.48 | 76 | 24 | Mesitylene | 20 |

Example 2

Data is listed in Table 2 and Table 3 for two different resin blend systems. The first system consisted of a $(RSiO_{3/2})_x(HSiO_{3/2})_y$ resin (referred to as $T^H T^{Iso}$ in the Tables), wherein R is isophytol (Iso), x is about 24 mole %, and y is about 76 mol %, blended with HSQ at 5 wt % or 15 wt %. The second blend system consisted of $(RSiO_{3/2})_x(HSiO_{3/2})_y$ resin (referred to as $T^H T^{C18}$ in the Tables), wherein R is octadecyl ($C_{18}$), x is about 24 mole %, and y is about 76 mol %, blended with HSQ at 5 wt % or 15 wt %. The formulations were spin coated as a solution in a mixture of MIBK and mesitylene. All of the films listed were cured at 400° C. for 1 hour under a nitrogen atmosphere. In a process comparison, films were processed with or without the use of hotplates. The hotplate temperatures used were 150° C., 200° C., and 350° C. for a 1 minute exposure at each temperature. During these hotplate exposures the films were exposed to an 8–12 vol % oxygen atmosphere. The data contained in Tables 2 and 3 show how the properties of the films processed with and without the hot plate combination. The improvement in modulus (Table 2) and reduction in Si—H level (Table 3) are directly linked to the use of the oxidizing hotplate step. It is expected that similar performance improvements would exist with various oxidation conditions, but without such exposure performance enhancements are not achieved.

TABLE 2

| Composition | HotPlates | Refractive Index | Modulus (GPa) | Dielectric Constant |
|---|---|---|---|---|
| HSQ | Yes | 1.374 | 5.8 | 2.75 |
| $T^H T^{Iso}$ (15%) + HSQ | No | 1.354 | 3.2 | 2.51 |
| $T^H T^{Iso}$ (15%) + HSQ | Yes | 1.375 | 11.5 | 3.09 |
| $T^H T^{Iso}$ (5%) + HSQ | No | 1.366 | 3.7 | 2.64 |
| $T^H T^{Iso}$ (5%) + HSQ | Yes | 1.383 | 9.3 | 3.00 |
| $T^H T^{C18}$ (15%) + HSQ | No | 1.359 | 3.4 | 2.70 |
| $T^H T^{C18}$ (15%) + HSQ | Yes | 1.379 | 13.9 | 3.07 |
| $T^H T^{C18}$ (5%) + HSQ | No | 1.366 | 3.3 | 2.64 |
| $T^H T^{C18}$ (5%) + HSQ | Yes | 1.381 | 11.5 | 2.99 |

TABLE 3

| Composition | After Coating | | After Hotplate | | After Cure | |
|---|---|---|---|---|---|---|
| | % SiH | SiO/SiH | % SiH | SiO/SiH | % SiH | SiO/SiH |
| HSQ | 97 | 6.4 | 88 | 7.1 | 74 | 9.6 |
| $T^H T^{Iso}$ (15%) + HSQ | — | — | — | — | 64 | 8.9 |
| $T^H T^{Iso}$ (15%) + HSQ | — | — | 50 | 12.6 | 39 | 17.3 |
| $T^H T^{Iso}$ (5%) + HSQ | 88 | 6.6 | — | — | 72 | 8.3 |
| $T^H T^{Iso}$ (5%) + HSQ | 88 | 6.6 | 61 | 10.7 | 49 | 14.3 |
| $T^H T^{C18}$ (15%) + HSQ | 80 | 7.0 | — | — | 68 | 8.5 |
| $T^H T^{C18}$ (15%) + HSQ | 80 | 7.0 | 49 | 13.4 | 40 | 17.6 |
| $T^H T^{C18}$ (5%) + HSQ | 89 | 6.7 | — | — | 75 | 8.0 |
| $T^H T^{C18}$ (5%) + HSQ | 89 | 6.7 | 61 | 11.0 | 50 | 14.0 |

Example 3

In Examples 3 and 4, "tBuO" refers to a tert-butoxy moiety. A formulation comprising $(tBuOSiO_{3/2})_{0.7}(HSiO_{3/2})_{0.3}$ (referred to as TQ resin) and hydrogen silsesquioxane (0.15 parts:0.85 parts) (see Table 4) was prepared by mixing 13 g TQ resin solution in MIBK (30% TQ solution) with 85 g HSQ (26 wt % hydrogen silsesquioxane in MIBK solution) and 2 g MIBK. The resulting solution concentration was 26 wt % resin. Solutions were spin coated on a SEMIX commercial spin coater using 150 mm single crystal silicon wafers. The spin speed was adjusted to achieve a target film thickness of 1 μm after cure. The as-spun films were exposed to a series of 3 hotplates set at 150° C., 200° C. and 350° C., respectively, for a duration of 1 minute each after spinning. The hotplate-baked films were then cured at 425° C. under $N_2$ at 60 min. Table 4 summarizes the thin film properties of HSQ resins and blends of HSQ resins with TQ resins. The blends show improved modulus and lower SiH levels compared to HSQ resins.

TABLE 4

| Material Description | Cure Temp (° C.) | Thickness (Å) | (RI) | Infrared Spectroscopy SiO/SiH | SiH Remaining | DK | Modulus (GPa) |
|---|---|---|---|---|---|---|---|
| HSQ | 425 | 9745 | 1.3856 | 10.70 | 67.00 | 2.74 | 6.45 |
| HSQ + 15 wt % $T^H_{0.3}Q^{OtBu}_{0.7}$ | 425 | 9433 | 1.376 | 16.04 | 45.75 | 3.20 | 9.97 |
| HSQ + 5 wt % $T^H_{0.3}Q^{OtBu}_{0.7}$ | 425 | 9655 | 1.386 | 14.71 | 50.21 | 3.09 | 11.40 |

Example 4
With UV Pretreatment

A formulation of TQ and HSQ (0.15 parts:0.85 parts) (Table 5) was prepared by mixing 3 g TQ resin solution (25 wt % TQ resin in MIBK) and 16.3 g HSQ solution (26 wt % HSQ in MIBK) and 0.06 g photoacid generator (General Electric UV-9380C). Each composition contained 2 wt % photoacid as catalyst. The mixture solution was then spin coated onto a bare silicon wafer at 2000 RPM for 20 sec and then exposed three times to 750 mJ/cm2 UV light. Then the film was cured at 400° C. for 60 min under a nitrogen atmosphere. The dielectric constant (K) and modulus of the cured films are given in Table 5. The dielectric constant for the blended films was similar to that of an HSQ film, but a higher modulus was obtained.

TABLE 5

| Resins | Thickness (Å) | RI | K | Modulus |
|---|---|---|---|---|
| $(tBuOSiO_{3/2})_{0.7}(HSiO_{3/2})_{0.3}$ | 4740 | 1.356 | * | 19.1 |
| $(tBuOSiO_{3/2})_{0.7}(HSiO_{3/2})_{0.3}$ + HSQ (5 parts:95 parts) | 10067 | 1.379 | 2.79 | 8.3 |

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A resin blend, comprising:
   (a) about 0.1 solids wt % to about 50 solids wt % of an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; and
   (b) about 50 solids wt % to about 99.9 solids wt % of a resin comprising at least about 90 mole % of the formula $HSiO_{3/2}$.

2. The resin blend of claim 1, wherein R is selected from the group consisting of $C_{18}$–$C_{20}$ alkyl and $C_{18}$–$C_{20}$ alkenoxy.

3. The resin blend of claim 2, wherein R is selected from the group consisting of 3,7,11,15-tetramethyl-3-hydroxyhexadecyl and octadecyl, x is from about 15 mole % to about 25 mole %, and y is from about 75 mole % to about 85 mole %.

4. The resin blend of claim 1, wherein R is a branched $C_4$–$C_{24}$ alkoxy, x is about 70 mole %, and a is about 30 mole %.

5. The resin blend of claim 1, further comprising a solvent selected from the group consisting of isobutyl isobutyrate, mesitylene, xylene, methyl isobutyl ketone (MIBK), and mixtures thereof, and the solids content of the resin solution is from about 15 w/v % to about 25 w/v %.

6. The resin blond of claim 1, further comprising about 2 w/v % photoacid.

7. A method of preparing a solid coating, comprising:
   (i) applying a resin solution comprising (a) an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkenoxy, and $C_{4-C24}$ alkenoxy, $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; is from about 10 mole % to about 95 mole %; and x+y is at least about 40 mole %; (1,) a solvent, wherein the resin solution comprises from about 0.5 w/v % total solids to about 50 w/v % total solids, and (c) about 50 solids wt % to about 99.9 solids wt % of a resin comprising at least about 90 mole % of the formula $HSiO_{3/2}$ to a surface;
   (ii) removing the solvent from the resin solution;
   (iii) removing R groups from the organosiloxane resin; and
   (iv) curing the resin solution, to form the solid coating.

8. A method of preparing a solid coating, comprising:
   (i) applying a resin solution comprising (a) an organosiloxane resin comprising the formula $(RSiO_{3/2})_x(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole % y, is from about 10 mole % to about 95 mole %; and x+y is at least about 40 mole %; and (b) a solvent, wherein the resin solution comprises from about 0.5 w/v % total solids to about 50 w/v % total solids, to a surface;
   (ii) removing the solvent from the resin solution;
   (iii) removing R groups from the organosiloxane resin, wherein removing R groups comprises baking the resin solution at about 350° C. for from about 1 sec to about 10 min under an oxidative atmosphere; and
   (iv) curing the resin solution, to form the solid coating.

9. A method of preparing a solid coating, comprising:

(i) applying a resin solution comprising (a) an organosiloxane resin comprising the formula $(RSiO_{3/2})_x$ $(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbons; x is from about 5 mole % to about 75 mole %; y is from about 10 mole % to about 95 mole %; and x+y is at least about 40 mole %; (b) a solvent, wherein the resin solution comprises from about 0.5 w/v % total solids to about 50 w/v % total solids; and (c) a photoacid, to a surface;

(ii) removing the solvent from the resin solution;

(iii) removing R groups from the organosiloxane resin, wherein removing R groups comprises exposing the resin to ultraviolet light; and (iv) curing the resin solution to form the solid coating.

10. A method of preparing a solid coating, comprising:

(i) applying a resin solution comprising (a) an organosiloxane resin comprising the formula $(RSiO_{3/2})_x$ $(R'SiO_{3/2})_y$, wherein R is a branched $C_4$–$C_{24}$ alkoxy; R' is selected from the group consisting of —H, $C_1$–$C_4$ unsubstituted hydrocarbon, and $C_1$–$C_4$ substituted hydrocarbon; x is about 70 mole %; and y is about 30 mole %; and (b) a solvent, wherein the resin solution comprises from about 0.5 w/v % total solids to about 50 w/v % total solids, to a surface;

(ii) removing the solvent from the resin solution;

(iii) removing R groups from the organosiloxane resin; and (iv) curing the resin solution, to form the solid coating.

11. A method of preparing a solid coating, comprising:

(i) applying a resin solution comprising (a) an organosiloxane resin comprising the formula $(RSiO_{3/2})_x$ $(R'SiO_{3/2})_y$, wherein R is selected from the group consisting of $C_4$–$C_{24}$ alkyl, $C_4$–$C_{24}$ alkenyl, $C_4$–$C_{24}$ alkoxy, $C_8$–$C_{24}$ alkenoxy, and $C_4$–$C_{24}$ substituted hydrocarbon; R' is selected from the group consisting of —H, $C_1$–$C_4$ unsubstituted hydrocarbon, and $C_1$–$C_4$ substituted hydrocarbon; x is from about 5 mole % to about 75 mole %; y is from about 10 mole % to about 95 mole %; and x+y is at least about 40 mole %; (b) a solvent, wherein the resin solution comprises from about 0.5 w/v % total solids to about 50 w/v % total solids; and (c) from about 0.1 wt % to about 10 wt % photoacid generator relative to resin, to a surface;

(ii) removing the solvent from the resin solution;

(iii) removing R groups from the organosiloxane resin; and (iv) curing the resin solution, to form the solid coating.

\* \* \* \* \*

UNITED STATES PATENT AND TRADEMARK OFFICE
CERTIFICATE OF CORRECTION

PATENT NO. : 6,737,117 B2
APPLICATION NO. : 10/116953
DATED : May 18, 2004
INVENTOR(S) : Ronald P. Boisvert et al.

It is certified that error appears in the above-identified patent and that said Letters Patent is hereby corrected as shown below:

In col. 12, line 18, delete "a" and insert --n--.

In col. 12, line 25, delete "blond" and insert --blend--.

In col. 12, line 31, insert --$C_4$-$C_{24}$ alkoxy,-- after "$C_4$-$C_{24}$ alkenyl,".

In col. 12, lines 31-32, delete "$C_4$-$C_{24}$ alkenoxy," and insert --$C_8$-$C_{24}$ alkenoxy,--.

In col. 12, line 32, delete "$C_4$-$C_{24}$ alkenoxy,".

In col. 12, line 36, insert --y-- between "about 75 mole %;" and "is from about".

In col. 12, line 37, delete "(1,)" and insert --(b)--.

In col. 12, line 56, insert a -- ; -- after "about 75 mole %" and delete the "," after "y".

In col. 13, line 9, delete "hydrocarbons" and insert --hydrocarbon--.

Signed and Sealed this

Twenty-second Day of May, 2007

JON W. DUDAS
*Director of the United States Patent and Trademark Office*